United States Patent [19]

Wyss et al.

[11] Patent Number: 4,959,230
[45] Date of Patent: Sep. 25, 1990

[54] COMPOSITION FOR EXTENDING SHELF LIFE OF FRUITS AND VEGETABLES

[75] Inventors: Clement R. Wyss, Hillsdale, N.J.; Michael T. McGuire, Elmhurst; John R. Frost, North Tarrytown, both of N.Y.

[73] Assignee: Kraft General Foods, Inc., Glenview, Ill.

[21] Appl. No.: 249,750

[22] Filed: Sep. 27, 1988

[51] Int. Cl.⁵ .............................. A23B 7/16
[52] U.S. Cl. .................. 426/102; 426/268; 426/270; 426/302; 426/615
[58] Field of Search ............... 426/262, 270, 102, 575, 426/72, 302, 615, 639, 640, 648, 268

[56] References Cited

U.S. PATENT DOCUMENTS

| | | |
|---|---|---|
| 2,098,209 | 6/1937 | Grande . |
| 2,536,176 | 1/1951 | Harriss . |
| 2,583,686 | 1/1952 | De Ment et al. . |
| 3,025,169 | 3/1962 | Guadagni ............... 426/270 |
| 3,138,464 | 6/1964 | Kruse . |
| 3,398,001 | 8/1968 | Benson . |
| 3,472,662 | 10/1969 | Mason . |
| 3,476,571 | 11/1969 | Block .................. 426/575 |
| 3,518,096 | 6/1970 | Layton . |
| 3,533,810 | 10/1970 | Shillington et al. . |
| 3,592,664 | 7/1971 | Verlin ................. 426/639 |
| 3,689,641 | 9/1972 | Spangler ............... 426/648 |
| 3,814,820 | 6/1974 | Busta et al. . |
| 3,851,067 | 11/1974 | Bryan ................. 426/102 |
| 3,899,589 | 8/1975 | Fischer ................. 426/72 |
| 3,987,208 | 10/1976 | Rahman et al. . |
| 4,011,348 | 3/1977 | Farrier et al. . |
| 4,140,649 | 2/1979 | Bossert et al. . |
| 4,352,746 | 10/1982 | Bracco et al. . |
| 4,478,859 | 10/1984 | Fox .................... 426/332 |
| 4,609,561 | 9/1986 | Wade .................. 426/567 |
| 4,675,195 | 6/1987 | Holton ................. 426/102 |
| 4,748,033 | 5/1988 | Syferb ................. 426/330.3 |
| 4,752,489 | 6/1988 | Wallace ................ 426/575 |

FOREIGN PATENT DOCUMENTS 60-58055  4/1985  Japan .

OTHER PUBLICATIONS

Maltrin Bulletin 12281, Grain Processing Corporation, Muscatine, Iowa.

*Primary Examiner*—Carolyn Paden
*Attorney, Agent, or Firm*—Daniel J. Donovan; Thomas R. Savoie

[57] ABSTRACT

A composition for reducing deterioration and extending the shelf life of fruits and vegetables, particularly fruits and vegetables used in salad bars and prepared salads sold in fast-food restaurants, comprising ascorbic acid and a thixotropic gum such as xanthan. Optionally, other ingredients such as an edible bulk filler and artificial or natural flavorings and/or aromas colorings may also be added. The composition applied to the salad ingredients to extend shelf life is advantageous in that a salad preserving agent is provided which is well retained by the salad ingredients so as to maintain freshness of the salad for long periods of time, and the extended shelf life provided is accomplished without sulfites and without adding any objectionable gummy mouthfeel to the product.

22 Claims, No Drawings

COMPOSITION FOR EXTENDING SHELF LIFE OF FRUITS AND VEGETABLES

FIELD OF THE INVENTION

This invention relates to a sulfite-free composition for minimizing discoloration and extending shelf life of foods, particularly fruits and vegetables, more particularly to a preservation composition comprising an organic food acid and a thixotropic gum, and to the use of such compositions for those purposes. For salads a combination of xanthan gum alone or combined with other thioxotropic gums and ascorbic acid alone or in combination with other organic acids is particularly preferred. It is also highly desirable to add aroma and or flavor compounds to enhance the salad flavor.

BACKGROUND OF THE INVENTION

It has recently become extremely popular for restaurants, fast-food establishments, and even supermarkets to Provide salad bars wherein patrons can prepare their own salads from freshly cut vegetables and fruits. However, these various salad ingredients will show physical signs of deterioration, such as wilting, drying, shrinking or browning, within a fairly short time period. After such physical deterioration, these fruits and vegetables are no longer marketable. In addition, certain fast-food restaurants now offer ready-made salads which are prepared and refrigerated, but these too must be discarded if not purchased after a certain period of time. Although the problem of preservation of fresh fruits and vegetables has been with us since these products were first marketed, the problem is a particularly marked one at present due to the great prevalence of freshly cut produce in salad bars and prepared, containered salads which have extremely short shelf lives.

Many attempts have been made over the years to combat the problems of browning, wilting, etc. in cut or whole fruit and vegetable matter. Various methods and compositions have been invented for combatting oxidative deterioration in these products, such as described in U.S. Pat. Nos. 4,140,649; 3,987,208; 3,814,820; and 3,533,510. In these patents, active agents disclosed for use in preventing deterioration include ascorbic acid, other edible acids, and other sulfites, sodium phosphates, sodium ascorbate, and potassium sorbate. Dry treatment with CMC and optional gums including locust bean, guar, carragaum, tragacanth, alginates, acacia, bentonite and agar have been used with fruit acids as a dry treatment for fruits to preserve them during heat treatment. It is highly desirable to develop a fruit or vegetable salad preservative which does not contain sulfites, yet which can be used effectively to prolong shelf life particularly for salad bar ingredients and pre-prepared salads. It is also desirable to develop a salad preservative which does not add any objectionable slimy, gummy or heavy mouthfeel to the salad ingredients.

SUMMARY OF THE INVENTION

In accordance with the present invention, a composition is provided for reducing deterioration and extending shelf life of fruits and vegetables which comprises edible organic acid preferably ascorbic acid and an edible thixotropic gum, preferably xanthan. The composition of the present invention is preferably used on salad bar ingredients and in prepared salads so as to ensure freshness, without adding an objectionable gummy mouthfeel to the salad and without the use of sulfites. The composition can also include a bulk filling agent, such as maltodextrin, and natural or artificial flavorings and/or aromas, and is applied as an aqueous solution.

DETAILED DESCRIPTION OF THE PREFERRED EMBODIMENTS

In accordance with the present invention, a composition which extends the shelf life of salad ingredients is provided which comprises an edible organic acid active ingredient and an edible thixotropic gum. It is particularly preferred that the thixotropic gum employed in the present invention comprises xanthan gum which provides a sheer thinning, non-slimy mouth feel. However, many other suitable gums can be used, at least in part, including guar gum, gum tragacanth, carrageenan gum, alginate gum, and karaya gum all which give sheer thinning properties but are less desirable due to their slimy mouth feel. The composition of the present invention also includes food grade organic acids to prevent discoloration. Preferred are ascorbic acid or isoascorbic acid alone or combined with other acids. Other useful food grade organic acids are citric acid, fumaric acid, tartaric acid, malic acid and the like. Where acidity can be tolerated, these acids, particularly citric, could be used alone although it is preferred to include ascorbic acid. Other active antidiscoloration agents, such as cysteine, can be used to replace all or part of the organic acid but are less desirable because of cost and taste.

In the preferred embodiment, the ratio by weight of the antidiscoloration acid to the edible thixotropic gum in the composition will range from about 1:1 to about 30:1, with a range of from about 3:1 to about 5:1 preferred for the antidiscoloration acids. The composition of the present invention is extremely effective in extending the short shelf life of fresh vegetables and salads, particularly in the case of ingredients prepared for salad bars and over-the-counter prepared salads. The composition of the present invention is successful in retaining freshness in such salad ingredients without the use of sulfites, and for longer periods of time than previously achievable.

Another application of this composition is a wash in preparing fruits and vegetables for drying.

The composition of the present invention will primarily comprise food grade ascorbic acid and food grade edible xanthan gum, but can also include a food grade bulk filler, such as maltodextrin. Other conventional ingredients such as flavoring and aroma agents and coloring agents may also be included. In general, where a bulk filler is employed, the ratio by weight of the bulk filling agent to the ascorbic acid will range roughly from 0.1:1 to 10:1, and preferably 0.3:1 to 3:1, and, most preferably, this range will be from about 0.666 to about 1.50:1.

It is preferred that the bulk filler used be maltodextrin, particularly low D.E. maltodextrin. The maltodextrin is preferably employed in the form of expanded low density maltodextrin.

A typical composition of the invention will contain the following ingredients by percentage of the total weight of the solid ingredients (dry basis):

(a) 20–60% edible bulk filler (e.g., maltodextrin)
(b) 20–60% ascorbic acid
(c) 1–50% edible xanthan gum.

The solid ingredients are dissolved in water prior to use although a liquid or aqueous concentrate may be prepared and diluted before use. A bulk filler improves the consistency of the aqueous solution and the wetability of the dry mix. In the composition of the invention, any conventional readily available food grade ascorbic acid can be employed. Generally, the ascorbic acid should comprise about 20–60% by weight, more preferably 25–50%, of the total weight of the solid ingredients of the composition.

A wide variety of natural and artificial flavoring and/or aromatizing agents can be used in the composition. These agents can be added to the composition comprising edible organic acid and the edible thixotropic gum alone, or can be added to compositions which include a bulk filling agent as well. In general, the flavoring and/or aromatizing agents will be employed in a ratio by weight to the ascorbic acid ranging from about 0.05:1 to about 1:1, with a range of about 0.1:1 to about 0.4:1 particularly preferred. A typical composition of the invention employing a flavoring agent and a bulk filling agent will contain the following ingredients (by weight percentage of the total weight of the solid ingredients):

(a) 20–60% edible bulk filler (e.g., maltodextrin)
(b) 20–60% edible organic acid (e.g., ascorbic acid and/or citric acid)
(c) 1–50% edible thixotroPic gum (e.g., xanthan and/or other shear thinning thixotropic gums).
(d) 1–25% natural or artificial flavoring and/or aroma agent.

An example of a natural flavor and/or aroma usable in the present invention is leaf essence, produced by General Foods, particularly useful with regard to compositions designed to be added to salad ingredients. Artificial lettuce flavoring agents are particularly useful in salads. Any suitable natural or artificial flavor or aroma, however, which is appropriate for a particular application can be used in the invention.

With regard to the gums usable in the present invention, it is generally preferred that a food grade thixotropic gum be employed in an amount ranging from about 1 to about 50% by weight of the total weight of the solid ingredients in the composition, depending on the particular gum chosen. Preferably, the gum should be used at a level of 1–25%, more particularly from 2–20%, and more preferably should comprise about 4–12% of the composition. It is necessary that the gums employed in the invention be used at these low percentages because when used at higher levels, particularly above 50%, they can add an objectionable mouthfeel to the product and reduce organoleptic acceptability. The composition of the present invention prevents the discoloration of salad ingredients yet does not add objectionable gummy qualities to the salad. It also retards wilting, drying, and deterioration of the salad. It is thus particularly important to use proportions of thixotropic gums as stated above to ensure that the salad ingredients treated maintain organoleptic acceptability.

In preparing the compositions of this invention it is preferable that a major amount of the edible organic acid comprises ascorbic acid, isoascorbic acid and mixtures thereof and, in addition, it is preferable that a major amount of the thixotropic gum comprise xanthan gum.

The composition of the present invention is preferably applied to whole or cut fruits, vegetables, or other salad ingredients in the form of an aqueous solution. The term "solution" is used in a general sense to include compositions in which one or more of the ingredients is not in true solution. Food grade co-solvents may be employed to facilitate dispersion of ingredients that are not readily dissolved in water. The solution containing the composition can be applied in any convenient and effective manner, such as spraying, dipping, by drops, etc. Ideally, a light spray of the preserving solution over a tray or platter of salad ingredients will be sufficient to apply an effective amount of the composition to the salad. By effective amount is meant that amount necessary to extend the shelf life of the fruit or vegetable ingredient treated. This amount will be in the range of from about 0.1% to 10% by weight of solid ingredients based on the weight of the salad treated, and preferably about 0.2% to 4%.

For individual active agents, the effective amount of thixotropic gum in solution needed to adhere the active ingredient or acid to the salad ingredients would range from 0.01% to 5% by weight of the solution, preferably from 0.01% to 2% by weight of the solution. In a similar manner the effective amount of organic acid needed to retard discoloration and improve storage ranges from 0.01% to 5% acid, preferably ascorbic, by weight of the solution, preferably from 0.01% to 2% by weight of the solution.

Generally, effective aqueous solutions containing the composition of the present invention can be prepared having a total solids concentration of roughly from about 10 to 50 g/l of solution, preferably about 20 to 30 g/l. An example of such a solution is the following:

| LOW D.E. maltodextrin | 50 grams |
| Ascorbic acid | 50 grams |
| Natural vegetable flavor | 15 grams |
| Xanthan gum | 10 grams |
| Water | to 5 liters |

Such a solution can be used to treat at least 50 pounds of salad vegetables, or approximately about 100 small individual salad servings, without adding significantly to the cost of an individual salad. In tests on various salads, the agueous solution formed using the composition of the present invention is able to prevent discoloration, wilting, and drying for long periods of time, thus extending the shelf life of the fruit and vegetable salad ingredients. It is clear that the composition of the present invention can provide an inexpensive, efficient and simple means to extend the shelf life of over-the-counter prepared salads or salad bar items, without adding sulfites, objectionable tastes, or gummy mouthfeel.

The following examples are presented as illustrative of the present invention and are not intended to limit its scope in any way:

EXAMPLE 1

Various tests are made with regard to the abilities of particular compounds to prevent deterioration and extend the shelf life of salads. Tests involve the use of solutions with ascorbic acid, xanthan gum, fresh lettuce flavor, water, or combinations of these ingredients. Three solutions are composed by weight percentages as follows:

| Solution 1: | Water 100% | |
| Solution 2: | Ascorbic acid | 1.0% |
| | Xanthan Gum | 0.2% |

|  | -continued | |
|---|---|---|
|  | Water | 98.8% |
| Solution 3: | Ascorbic acid | 1.0% |
|  | Xanthan Gum | 0.2 |
|  | fresh lettuce flavor | 0.1% |
|  | Water | 98.7% |

Salads are prepared using fresh cut vegetables including lettuce, tomatoes, cucumbers, peppers and radishes. The solutions described above are applied to the salad ingredients by dipping the food in the solutions, and afterwards the salads were stored in the refrigerator in 5-ounce salad dishes with lids. After days, observations are as follows:

(a) Salad treated with Solution 1 (water only):
Lettuce: Good, but dry, mealy, slightly brown and shriveled.
Tomato: Dry and shriveled.
Cucumber: Dry, shriveled and mealy.
Pepper: Dry, shriveled and mealy.
Radish: Dry, shriveled and mealy.

(b) Salad treated with Solution 2 (Ascorbic acid and xanthan):
Lettuce: Better than control; crisp and moist.
Tomato: Better than control; crisp and moist.
Cucumber: Better than control; crisp and moist.
Pepper: Better than control; crisp and moist.
Radish: Best condition of series, excellent condition.
Overall condition: Acceptable for sale.

(c) Salad treated with Solution 3 (Ascorbic acid, xanthan and flavor):
Lettuce: Best condition of series; crisp and moist.
Tomato: Best condition of series; crisp and moist.
Cucumber: Best condition of series; crisp and moist.
Pepper: Best condition of series; crisp and moist.
Radish: Very good condition; crisp and moist.
Overall condition: Best overall, acceptable for sale.

The various solutions employing ascorbic acid and xanthan gum are thus observed to have excellent results in extending the shelf life of salads. On opening the salad containers treated with solution 3 the flavor and/or aroma enhancement added to the overall quality observed. Obviously, individual salad ingredients can be treated with specific effective active ingredients to maximize the quality of each individual salad ingredient.

EXAMPLE 2

An aqueous solution made from the composition of the present invention is tested to determine its ability of preserving the freshness and extending the shelf life of fruit salad. Cups of fruit salad are prepared comprised of ¼ inch irregular cubes of peeled and cut (fresh) Granny Smith apples, whole de-stemmed fresh red seedless grapes, canned mandarin orange sections and canned pineapple chunks. Half of this fruit salad is treated by dipping the cut fruit in a solution of 0.95% ascorbic acid, 0.20% xanthan gum, 0.95% low density maltodextrin, and 97.9% water. The other half of the fruit salad is dipped only in water. The fruit salad is placed in 5-ounce salad dishes with lids and stored in a refrigerator. The observations are as follows:

| Time of Placement in refrigerator | Control (Water Only) | Salad with Solution Applied |
|---|---|---|
| 0 days refrigeration | Fresh; good, clean. | Fresh; good, clean. |
| 2 days refrigeration | Moldy grapes, Brown apples. | Fresh; good, clean. |
| 4 days refrigeration | Moldy grapes; Brown, moldy apples; Apples dry. | Fresh; good, clean. |
| 8 days refrigeration | Moldy grapes; Very brown, moldy applies; apples; Apples dry and shriveling. | Moldy grapes; All else fresh. |

The solution employing a composition of the present invention is thus successfully used to extend the shelf life of fruit salads. Obviously, the stability extension of the grapes beyond four days could be achieved by the addition of an antimicrobial active agent to the composition or by treatment of the grapes separately.

EXAMPLE 3

A composition according to the present invention is produced using the following ingredients:

| INGREDIENT | WEIGHT |
|---|---|
| Low density Maltodextrin, | 50 gms (40%) |
| L-Ascorbic Acid | 50 gms (40%) |
| Natural Vegetable Flavor Leaf Essence G.F. | 15 gms (12%) |
| Xanthan Gum, | 10 gms (8%) |
| TOTAL | 125 gms |

The above solid ingredients are dissolved in 5 liters of water (11 pounds) and the solution is used to treat 50 pounds of salad vegetables (corresponding to about 100 individual salad servings). The solution prepared was successful and inexpensively extended the shelf life of various prepared salads.

EXAMPLE 4

A composition according to the present invention is produced as follows:

| INGREDIENT | WEIGHT |
|---|---|
| Low density Maltodextrin, | 50 gms (40%) |
| L-Ascorbic Acid | 50 gms (40%) |
| Artificial Lettuce Flavor | 15 gms (12%) |
| Xanthan Gum, | 10 gms (88%) |
| TOTAL | 12 gms |

The above composition is dissolved in 5 liters of water and is used to treat 50 pounds of salad vegetables, at even less expense than the composition described in Example 3. The composition is successful in extending the shelf life of the individual salad servings.

What is claimed is:

1. A sulfite-free coating composition for reducing deterioration and extending the shelf life of fresh fruits and vegetables comprising an edible, organic acid antidiscoloring agent selected from the group consisting of ascorbic acid, isoascorbic acid, citric acid, fumaric acid, tartaric acid and malic acid, an edible thixotropic gum selected from the group consisting of xanthan gum, guar gum, gum tragacanth, carrageenan gum, alginate gum, and karaya gum, and an edible maltodextrin bulk filler, the weight ratio of the edible gum to the edible acid being from about 1:1 to 30:1, and the weight ratio of the maltodextrin bulk filler to the edible acid being from about 0.1:1 to 10:1.

2. A composition according to claim 1, wherein said edible acid comprises ascorbic acid and said edible gum comprises xanthan gum in a weight ratio of acid to gum of about 3:1 to 5:1.

3. A composition according to claim 2, wherein said bulk filler comprises maltodextrin and wherein the weight ratio of maltodextrin to ascorbic acid is about 0.3:1 to 3:1.

4. A composition according to claim 3, wherein said maltodextrin comprises a low DE maltodextrin.

5. A composition according to claim 1, further comprising water.

6. A method of reducing the deterioration and extending the shelf life of cut pieces of fresh fruit or vegetables comprising coating cut pieces of fresh fruit or vegetables with an aqueous coating composition which comprises in edible organic acid antidiscoloration agent and an edible thixotropic gum, the weight ratio of the acid to the gum being about 1:1 to 30:1, the coating weight of the solid ingredient of said aqueous coating composition is about 0.1 to 10% based on the weight of the fruit or vegetable to which the aqueous coating composition is applied, the amount of said edible acid and gum coated onto said cut pieces of fresh fruit or vegetables being effective to reduce deterioration and extend the shelf life thereof.

7. A method according to claim 6, wherein the edible acid and the edible gum are each present in said aqueous composition in an amount of about 0.01 to 5% by weight.

8. A method according to claim 6, wherein said aqueous composition further comprises a bulk filler in a weight ratio to the edible acid of about 0.1 to 10:1.

9. A method according to claim 8, wherein said bulk comprises xanthan gum.

10. A method according to claim 6, wherein said edible acid comprises ascorbic acid and wherein said edible gum comprises xanthan gum 11. A method according to claim 10, wherein the weight ratio of ascorbic acid to xanthan gum is about 3:1 to 5:1.

12. A method according to claim 11, wherein said composition further comprises a bulking agent.

13. A method according to claim 12, wherein said bulking agent comprises maltodextrin in a weight ratio to said ascorbic acid of about 0.3:1 to 3:1.

14. A method according to claim 13, wherein said maltodextrin comprises a low DE maltodextrin.

15. Freshly cut fruit or vegetable pieces having a coating which reduces deterioration and extends shelf life thereof, said coating comprising an edible organic acid antidiscoloration agent and an edible thixotropic gum, the weight ratio of the acid to the gum being about 1:1 to 30:1, the coating is present in an amount such that the solid coating is about 0.1 to 10% by weight based on the weight of the fruit or vegetable pieces bearing said coating, the amount of said edible acid and gum coated onto said cut pieces of fresh fruit or vegetables being effective to reduce deterioration and extend the shelf life thereof.

16. Freshly cut fruit or vegetable pieces according to claim 15, wherein said coating further comprises a bulk filler in a weight ratio to the edible acid of about 0.1 to 10:1.

17. Freshly cut fruit or vegetable pieces according to claim 16, wherein said bulk filler comprises maltodextrin.

18. Freshly cut fruit or vegetable pieces according to claim 15, wherein said edible acid comprises ascorbic acid and wherein said gum comprises xanthan gum.

19. Freshly cut fruit or vegetable pieces according to claim 18, wherein the weight ratio of ascorbic acid to xanthan gum is about 3:1 to 5:1.

20. Freshly cut fruit or vegetable pieces according to claim 19, wherein said composition further comprises a bulk filler.

21. Freshly cut fruit or vegetable pieces according to claim 20, wherein said bulking agent comprises maltodextrin in a weight ratio to said ascorbic acid of about 0.3:1 to 3:1.

22. Freshly cut fruit or vegetable pieces according to claim 21, wherein said maltodextrin comprises a low DE maltodextrin.

* * * * *